(12) United States Patent
Mehnert

(10) Patent No.: US 12,027,040 B2
(45) Date of Patent: Jul. 2, 2024

(54) METHOD AND DEVICE FOR PROVIDING ANNOTATED TRAFFIC AREA DATA

(71) Applicant: Robert Bosch GmbH, Stuttgart (DE)

(72) Inventor: Jens Eric Markus Mehnert, Malmsheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 658 days.

(21) Appl. No.: 17/067,047

(22) Filed: Oct. 9, 2020

(65) Prior Publication Data
US 2021/0125491 A1    Apr. 29, 2021

(30) Foreign Application Priority Data

Oct. 24, 2019    (DE) .......................... 102019216357.2

(51) Int. Cl.
*G08G 1/01*     (2006.01)
*G06N 20/00*    (2019.01)

(52) U.S. Cl.
CPC .......... *G08G 1/0133* (2013.01); *G06N 20/00* (2019.01); *G08G 1/0129* (2013.01)

(58) Field of Classification Search
CPC .... G08G 1/0133; G08G 1/0129; G08G 1/012; G08G 1/04; G08G 1/0112; G06N 20/00; G06N 3/084; G01C 21/3804; G01C 7/04; G01C 21/04; G06F 16/29; G06F 18/214; G06F 18/24; G06K 9/62
See application file for complete search history.

(56) References Cited

U.S. PATENT DOCUMENTS

| | | | |
|---|---|---|---|
| 10,962,630 B1* | 3/2021 | Walls | G01S 7/4972 |
| 11,087,494 B1* | 8/2021 | Srinivasan | G06V 20/584 |
| 2019/0065864 A1* | 2/2019 | Yu | G06V 10/764 |
| 2020/0023842 A1* | 1/2020 | Gutierrez | G06V 20/584 |
| 2020/0124430 A1* | 4/2020 | Bradlow | B62J 45/412 |
| 2020/0364953 A1* | 11/2020 | Simoudis | G06N 5/022 |
| 2020/0394515 A1* | 12/2020 | Koike | G06V 20/58 |
| 2021/0042643 A1* | 2/2021 | Hong | G06N 3/047 |
| 2021/0056321 A1* | 2/2021 | Arechiga Gonzalez | G06V 20/582 |
| 2022/0076064 A1* | 3/2022 | St. Romain, II | G06F 18/214 |
| 2022/0262100 A1* | 8/2022 | Chandler | G06T 15/50 |

FOREIGN PATENT DOCUMENTS

| | | |
|---|---|---|
| CN | 102567449 A | 7/2012 |
| CN | 104553982 A | 4/2015 |
| CN | 108345838 A | 7/2018 |

* cited by examiner

*Primary Examiner* — Aryan E Weisenfeld
(74) *Attorney, Agent, or Firm* — NORTON ROSE FULBRIGHT US LLP; Gerard A. Messina

(57) ABSTRACT

A method for providing annotated traffic area data. The method includes a step of reading in traffic area data that in each case represent a section of a traffic area used by a road user, and reading in automatically detected position data of the road user in the traffic area. In addition, the method includes a step of associating in each case at least one annotation data set with the traffic area data at which the road user is situated at the moment, corresponding to the detected position data, in order to obtain the annotated traffic area data that signal a use option and/or movement option of the traffic area, represented by the traffic area data, by another road user, in particular the annotation data set having been generated using a machine learning method and/or a classifier based on a machine learning algorithm.

8 Claims, 2 Drawing Sheets

METHOD AND DEVICE FOR PROVIDING ANNOTATED TRAFFIC AREA DATA

CROSS REFERENCE

The present application claims the benefit under 35 U.S.C. § 119 of German Patent Application No. DE 102019216357.2 filed on Oct. 24, 2019, which is expressly incorporated herein by reference in its entirety.

FIELD

The present invention is directed to a device and a method for provided annotated traffic area data. The present invention also relates to a computer program.

BACKGROUND INFORMATION

To make autonomous driving possible, at the present time enormous amounts of costly annotation data are generated (as takes place, for example, in third-generation video signal processing), which also contain errors due to "label noise," since human annotators must solve an annotation problem, which necessitates estimations without direct quality control (for example, estimation of the correct road user class). These estimations require subsequent quality control of the annotation data, in which annotation errors may be overlooked.

One possible approach for solving such a problem would be to provide annotation only for those areas that are actually traveled by a vehicle, which would limit the complexity of providing these annotations at least to relevant areas.

SUMMARY

In accordance with the present invention, methods, devices that use these methods, and a corresponding computer program are provided. Advantageous refinements and enhancements of the example embodiments of the present invention are possible via the measures described herein.

In accordance with an example embodiment of the present invention, a method is provided for providing annotated traffic area data, the method including the following steps:
reading in traffic area data that in each case represent a section of a traffic area used by a road user, and reading in automatically detected position data of the road user in the traffic area; and
associating in each case at least one annotation data set with the traffic area data at which the road user is situated at the moment, corresponding to the detected position data, in order to obtain the annotated traffic area data that signal a use option and/or movement option of the traffic area, represented by the traffic area data, by another road user, in particular the annotation data set having been generated using a machine learning method and/or a classifier based on a machine learning algorithm.

Traffic area data may be understood to mean data that represent a surroundings in the area of the road user, for example as a map. A section of a traffic area may be understood to mean, for example, a parcel that depicts a portion of the traffic area; for example, this section may be two-dimensional and may depict a roadway surface or a portion of a sidewalk. A traffic area may be understood to mean, for example, an area that is publicly accessible and is used for the movement of road users. In the present context, a road user may be understood to mean a person, for example a pedestrian, or an object, for example a vehicle. In the present context, an annotation data set may be understood to mean, for example, metadata that are associated with the individual traffic area data that describe a section of the traffic area and that contain further information concerning a property or a parameter that is or may be relevant for another road user when the road user would like to move in the section of the traffic area that is depicted by the traffic area data in question. An annotation for the traffic area data may be understood to mean, for example, the annotation data set that is associated with the traffic area data for the section at which the road user is situated. Position data may be understood to mean data that depict an instantaneous position of the road user, and that are provided, for example, as coordinates of a global satellite navigation system. A road user class of a road user may be understood to mean, for example, a group of preferably identical characteristics or types of road user, such as the road user class of passenger vehicles, motorcycles, trucks, buses, bicycles, or pedestrians as a road user. A machine learning method or a classifier based on a machine learning algorithm may be understood to mean an algorithm which due to a previously carried out training phase has reached a state in which, when supplied with data, may make an estimate or evaluation of whether sections of the traffic area in question, which are being traveled at the moment or used in general by the road user, may also be used by other road users.

In accordance with an example embodiment of the present invention, the annotated traffic area data may be provided very quickly, comprehensively, and reliably when the traffic area data, which often result from automatic imaging of the surroundings of the road user, are linked to automatically detected position data of the road user, so that via the annotation data set associated with the traffic area data, it is recognizable from the annotated traffic area data that the road user has in fact used or traveled the section of the traffic area in question. In this way it may be automatedly detected which areas or sections of a traffic area have been used by a road user (in particular, a road user of a certain road user class), so that it may be deduced that future road users, in particular of this certain road user class, may also use the section of the traffic area in question. Thus, it is advantageously not necessary to further correct or edit traffic area data that represent the sections of a traffic area, or to completely provide them with the annotation data, manually or via human interventions.

According to one particularly advantageous specific embodiment of the present invention, in the step of associating to obtain the annotated traffic area data, in addition at least one neighboring annotation data set may be associated with neighboring traffic area data, which in each case represent a section of the traffic area neighboring the traffic area data, in particular the neighboring annotation data sets having been generated using a machine learning method and/or a classifier based on a machine learning algorithm. In the present context, a neighboring annotation data set may be understood to mean an annotation data set that is associated with neighboring traffic area data. This neighboring annotation data set may likewise once again contain metadata, as described in greater detail above with regard to the annotation data set. The neighboring traffic area data may be understood to mean traffic area data that represent sections which directly adjoin sections that are used by the road user in the traffic area. Such a specific embodiment of the present invention may offer the advantage that a piece of information may thus be estimated or ascertained concerning, for example, whether a side area of a roadway or a pedestrian walkway may likewise be used by the road user or another road user, in particular of a certain road user class, when this road user uses a neighboring section of the traffic area. In addition, by using a machine learning method or a classifier based on a machine learning algorithm, such as a neural network, relationships may be ascertained concerning whether, and optionally to what extent, the sections of the traffic area that (directly, for example) adjoin the sections that are actually in use by the road user in the traffic area may also be used by the road user or another road user.

In addition, in one advantageous specific embodiment of the present invention, in the step of reading in, the neighboring data sets for neighboring traffic area data are read in that represent a traffic area that is not in use at the moment, or is not to be used, by the road user. It is thus possible to not only achieve an estimate of the usability of the section of the traffic area actually in use by the road user, but also to make a statement concerning the usability of other areas, adjoining the section in use at that moment, by certain road users.

According to a further specific embodiment of the present invention, in the step of reading in, a road user class that represents a type of road user may be read in, in the step of associating, the annotation data set associated with the traffic area data being ascertained using the road user class. A road user class may, for example, be a class that classifies the road user as a pedestrian, cyclist, passenger vehicle, truck, bus, or motorcyclist. Such a specific embodiment of the approach presented here offers the advantage of being able to make an estimate of the informative value of the annotated traffic area data, in particular for other road users, so that the information from the annotated traffic area data may be used very easily to assess the options for use of the traffic area by the other road user. For example, it may thus be estimated that a traffic area that is used by a truck as road user, which provides the annotated traffic area data, in fact may also be used by a passenger vehicle as road user.

One specific embodiment of the present invention described herein is also possible in which, in the step of reading in, a vertical profile of the road user above the traffic area used by the road user, which represents a contour of the road user, and/or a silhouette which represents the contour of the road user above the traffic area used by the road user, are/is read in, in the step of associating, the annotation data set associated in each case with the traffic area data being ascertained using the vertical profile and/or the silhouette. Such a vertical profile or a silhouette or contour may be understood to mean a spatial or three-dimensional area that is required or occupied by the road user when using the section of the traffic area. It is thus advantageously possible for certain road users to reliably have certain spatial requirements of road users over the particular used sections of the traffic area, so that, for example for subsequent road users on these particular used sections, information may be provided that these sections have already been used once by such a road user. For example, information may thus be very easily stored in the traffic area data that a street is very narrow due to vegetation on the side, so that a passenger vehicle, for example, may use this street, but a truck which has a different vertical profile or a different silhouette or contour may not use this street.

One specific embodiment of the present invention is particularly easy to carry out in which, in the step of reading in, traffic area data are read in that represent sections of the traffic area of the road user used by a road user, and that have been ascertained using images recorded with the aid of a camera, and/or in the step of reading in, position data are read in that have been ascertained using an odometry unit and/or a satellite navigation system. Such a camera or odometry unit is now often installed in vehicles as standard equipment, so that by using these images recorded by the camera as traffic area data, or the position data provided by the odometry unit, the traffic area data may be generated and corresponding sections may be subdivided very quickly and efficiently.

One specific embodiment of the present invention is particularly relevant for use of the traffic area data provided with at least one annotation, in which, in the step of reading in, traffic area data are read in that represent sections of the traffic area of a road user used by the road user which are designed and/or identifiable as a roadway for at least one vehicle or as a pedestrian walkway. The method provided here may thus be used very advantageously, in particular within the scope of classifying or assessing an option for use of roadways, for example for motorized vehicles or also bicycles, or sidewalks.

According to a further specific embodiment of the present invention, at least the step of reading in and/or of associating may be carried out in a mobile unit of the road user and/or in a central, stationary processing unit, and/or after the step of associating, a step of transmitting the annotated traffic area data to a central, stationary processing unit is provided. A central, stationary processing unit may be understood to mean a cloud server, for example. Such a specific embodiment offers the advantage that, depending on the available computing power or data transmission capacity, algorithms that are fairly complex numerically or in terms of circuitry may be executed at favorable locations in each case, it still being possible to ensure good availability of the traffic area data that are provided with at least one annotation.

In addition, according to a further specific embodiment of the method in accordance with the present invention for evaluating a use of sections of the traffic area to be used by a road user, the method includes the following steps:

reading in annotated traffic area data that have been created using a variant of a method presented here, and position data that represent an instantaneous or future position of the road user; and checking an option for use of at least one section of the traffic area by the road user, using the annotation data set and the position data.

Such a specific embodiment of the present invention may offer the advantage of allowing the provided and annotated traffic area data to be advantageously utilized, for example to be able to estimate in advance whether certain sections of the traffic area may be used by the road user (for example, of a certain road user class), or whether this is not possible, or is possible only with significant problems, due to experience of/information from road users that have previously used this section of the traffic area.

In addition, according to one further specific embodiment of the present invention, a method for training a classifier based on a machine learning algorithm may be provided, the method including the following steps:

reading in first traffic area data which in each case represent a section of a traffic area that is used or is to be used by a first road user, as well as automatically detected first position data of the first road user, and reading in second traffic area data which in each case represent a section of a traffic area that is used or is to be used by a second road user, as well as automatically detected second position data of the second road user; and training elements of the classifier, using the first and second traffic area data and the first and second position data.

Such a specific embodiment of the present invention may offer the advantage, by using the classifier based on a machine learning algorithm, such as a neural network, and the traffic area data, provided by multiple road users, for a certain section or multiple certain sections of the traffic area, of being able to train this classifier in such a way that, in associating the annotation data sets with the traffic area data, it is also possible to make a statement concerning whether the sections of the traffic area that are not in use at the moment by a present road user, but which adjoin sections of the traffic area that are used by the road user, likewise may be used by a road user (for example, of the same road user class).

The variants of this method presented here may be implemented, for example, in software or hardware or in a mixed form of software and hardware, for example in a control unit or a device.

The present invention also provides a device that is designed to carry out, control, or implement the steps of one variant of a method presented here in appropriate units. In addition, the object underlying the present invention may also be quickly and efficiently achieved via this embodiment variant of the present invention in the form of a device.

For this purpose, the device may include at least one processing unit for processing signals or data, at least one memory unit for storing signals or data, at least one interface to a sensor or to an actuator for reading in sensor signals from the sensor or for outputting data signals and control signals to the actuator, and/or at least one communication interface for reading in or outputting data that are embedded in a communication protocol. The processing unit may be, for example, a signal processor, a microcontroller, or the like, and the memory unit may be a flash memory, an EEPROM, or a magnetic memory unit. The communication interface may be designed for reading in or outputting data wirelessly and/or in a hard-wired manner; a communication interface which may read in or output the hard-wired data may read in these data electrically or optically, for example, from an appropriate data transmission line, or output same to an appropriate data transmission line.

In the present context, a device may be understood to mean an electrical device that processes sensor signals and outputs control and/or data signals as a function thereof. The device may include an interface which may have a hardware and/or software design. In a hardware design, the interfaces may be part of a so-called system ASIC, for example, which contains various functions of the device. However, it is also possible for the interfaces to be dedicated, integrated circuits, or to be at least partially made up of discrete components. In a software design, the interfaces may be software modules that are present on a microcontroller, for example, alongside other software modules.

Also advantageous is a computer program product or a computer program including program code which may be stored on a machine-readable medium or memory medium such as a semiconductor memory, a hard disk, or an optical memory, and used for carrying out, implementing, and/or controlling the steps of the method according to one of the specific embodiments described above, in particular when the program product or program is executed on a computer or a device.

Exemplary embodiments of the present invention are illustrated in the figures and explained in greater detail below.

BRIEF DESCRIPTION OF THE DRAWINGS

In the description below of advantageous exemplary embodiments of the present invention, identical or similar reference numerals are used for the elements having a similar action which are illustrated in the various figures, and a repeated description of these elements is dispensed with.

DETAILED DESCRIPTION OF EXAMPLE EMBODIMENTS

Figure 1:
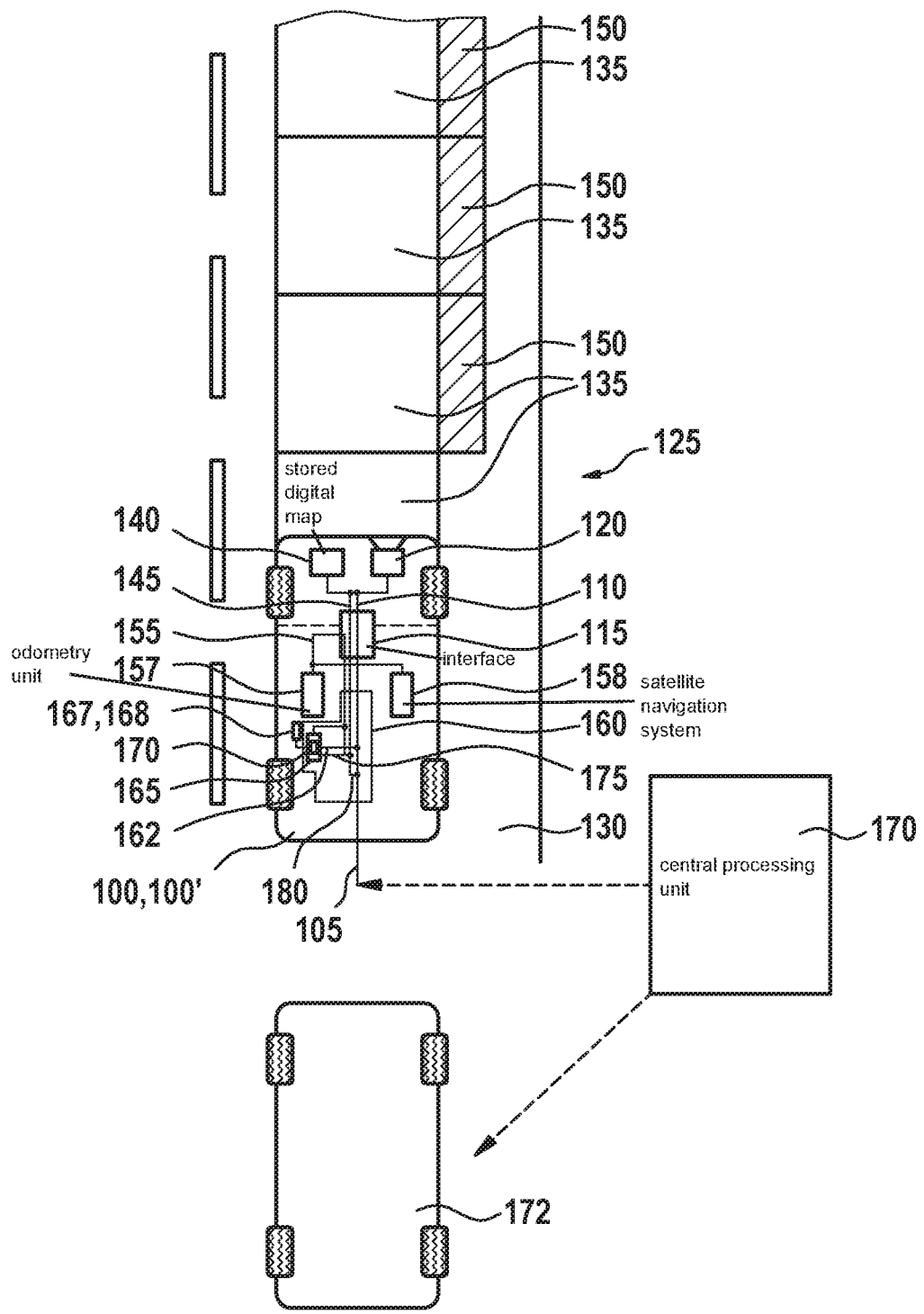
FIG. 1 shows an illustration of a scenario in which annotated traffic area data are provided by a road user, for example a vehicle.

FIG. 1 shows an illustration of a scenario in which annotated traffic area data 105 are provided by a road user 100, for example a vehicle. Traffic area data 110 are initially read in via an interface 115, it being possible for these traffic area data 110 to originate, for example, as image data of an optical camera 120 that records surroundings 125 around road user 100. In the exemplary embodiment illustrated in FIG. 1, road user 100 is traveling on a street as a traffic area 130, so that camera 120 images sections 135 that are used by the vehicle as road user 100, i.e., are traveled on or used immediately afterward.

Alternatively or additionally, traffic area data 110 may also be read out from a stored digital map 140 in which sections 135 of the street as a traffic area 130, to be used by road user 100 as a vehicle, are stored.

Furthermore, also provided, for example, by camera 120 and/or from digital map 140 are neighboring traffic area data 145 which in each case represent neighboring sections 150 that adjoin sections 135 which are used, in the present case traveled or used immediately afterward, by the vehicle as road user 100.

In addition, position data 155 that represent an instantaneous position of road user 100, in the present case the vehicle, and that have been automatically detected are also provided via interface 115. Position data 155 may be obtained from an odometry unit 157, for example, by evaluating the movement trajectory of road user 100, optionally with the aid of data from digital map 140. Alternatively or additionally, position data 155 may be obtained using a receiver of a satellite navigation system 158, for example the GPS system.

An applicable annotation data set 162 in each case that has been generated in an annotation data set generation unit 165, using the instantaneous position of road user 100, is then associated with traffic area data 110, for example, in an association unit 160. A further piece of information, such as a vertical profile 167 or a silhouette that indicates the spatial extension of road user 100, may be used for this purpose. It is also possible that the further piece of information is a road user class 168 of the road user 100, in this case for example the road user class of passenger vehicles as road user, and is included in annotation data set 162. By using such a procedure, it is now possible to associate metadata, which may also be referred to as annotation, with individual sections 135 that are actually used by road user 100, and that are identifiable by the instantaneous position corresponding to position signal 155, as an annotation data set 162 in order to pack into annotated traffic area data 105 a piece of information concerning the usability of sections 135 in question by road user 100. If, for example, annotated traffic area data 105 are now transmitted to a central processing unit 170, such as a cloud server, and from there are transmitted to another road user 172, this other road user 172 may evaluate annotated traffic area data 105, using its own instantaneous position, and recognize whether sections 135 represent a driving path that may be used by it as other road user 172. It may also be taken into account whether other road user 172 has the same road user class 168 as road user 100. It may thus be recognized, for example, that for the case that road user 100 is a truck and other road user 172 is a passenger vehicle, due to the smaller external dimensions of other road user 172 it is extremely likely that sections 135 may also be used or traveled by other road user 172. In contrast, for the case that road user 100 is a passenger vehicle and other road user 172 is a truck, it is not possible to unambiguously recognize that sections 135 may also be used by other road user 172, or at least a warning may be output.

To allow not only an option for use of selected sections 135, which are usually close to the spatial dimensions of instantaneous road user 100, by other road users 172, to be estimated, but also the option for use of neighboring sections 150 that adjoin sections 135 to be taken into account for the automatic detection and evaluation of the option for use of traffic area 130, association unit 160 may associate a neighboring annotation data set 175 that has been provided by a classifier 178, for example, which for example is situated in annotation data set generation unit 165 and based on a machine learning algorithm, with neighboring traffic area data 145, which in each case represent a neighboring section 150. These neighboring traffic area data 145, which are provided with neighboring annotation data set 175, have been provided with reference numeral 180 in FIG. 1, and may likewise be associated with annotated traffic area data 105.

Classifier 178 may generate this neighboring annotation data set 175 which is associated with neighboring traffic area data 145, for example using a trained neural network or some other machine learning-based algorithm, for example taking into account the instantaneous position of road user 100 and/or section 135 that is instantaneously used by road user 100, which may be taken from position data 155. It is thus possible to make a quite reliable statement concerning the option for use of neighboring sections 150, which adjoin sections 135, by other road users 172, and this information may also be passed on to other road users 172, for example likewise once again via central processing unit 170.

Alternatively or additionally, classifier 178 may also generate annotation data set 162 which is associated with traffic area data 110, for example taking into account the instantaneous position of road user 100 and/or section 135 that is instantaneously used by road user 100, which may be taken from position data 155. It is thus possible to make a quite reliable statement concerning the option for use of sections 135 by other road users 172, and also to pass on this information to other road users 172, for example likewise once again via central processing unit 170.

This classifier 178 should be trained in a preceding training method in such a way that annotation data set 162 and/or neighboring annotation data set 175 provided by classifier 178 already allow(s) a quite good prediction of the option for use of sections 135 and/or neighboring sections 150 by other road users 172. This training or teaching may take place by using multiple sets of annotated traffic area data 105, i.e., using at least first annotated traffic area data 105 that originate from a first road user such as road user 100, and second annotated traffic area data 105' that originate from a second road user 100 which uses traffic area 130, for example, at a later point in time, and thus with slightly different sections 135. If, for example, vertical profile 167, the silhouette, and/or road user class 168 of particular road user 100 or 100' are/is now also taken into account, classifier 178 may be trained very precisely with the algorithms that are now available, so that the usability of particular sections 135 and/or neighboring sections 150 by other road users 172 may be predicted very well, even during the evaluation of sections 135 of traffic area 130 when road user 100 is traveling.

It is also possible that association unit 160 is not accommodated in a unit of road user 100, in the present case the vehicle, for example, but instead may be situated in central processing unit 170, for example. Alternatively or additionally, interface 115 may be situated in central processing unit 170. In that case, traffic area data 110 and/or position data 155 and optionally also neighboring traffic area data 145 provided with neighboring annotation data set 175, together with further information such as vertical profile 167, the silhouette, and/or road user class 168 of road user 100, would thus be transmitted to central processing unit 170, provided that these data for road user 100, in particular in its instantaneous position, are not already present in central processing unit 170.

Figure 2:
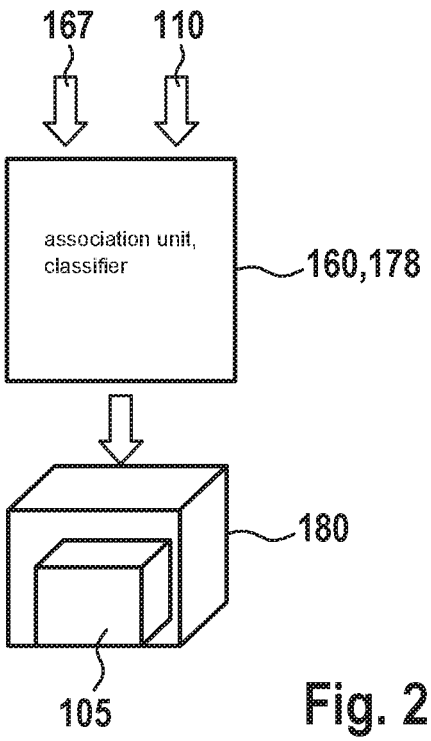
FIG. 2 shows a schematic mode of operation of association unit 160 together with classifier 178 according to a further exemplary embodiment of the present invention.

FIG. 2 shows a schematic mode of operation of association unit 160 together with classifier 178 according to a further exemplary embodiment. Classifier 178 is designed, for example, as a module having an artificial intelligence function. A parameter set that contains, for example, information concerning the vehicle shape of road user 100 from FIG. 1, optionally in the form of vertical profile 167 or the silhouette of road user 100, is supplied to this association unit 160 together with classifier 178. In addition, further data such as traffic area data 110 or position data 155 may now be supplied as sensor data to association unit 160 together with classifier 178 according to the illustration from FIG. 1. Classifier 178 or association unit 160 may then output annotated traffic area data 105 that correspond to a 3D illustration of the space actually occupied by road user 100 or that represent such an illustration. In addition, association unit 160, in particular classifier 178 here, may also output neighboring traffic area data 145 that are provided with neighboring annotation data sets 175 and denoted by reference numeral 180 in FIG. 1, which in a 3D illustration corresponds to a free space volume of traffic area 130 that may be used by road user 100 and another road user 172.

In summary, it is pointed out that a main objective of the approach presented here may be regarded as approximating the temporally traversable/drivable/accessible free space (as a traffic area that is usable by a road user), for example with the aid of a classifier such as a neural network, without the need for manually annotated data. One main aspect of the approach presented here is computing the area in which a dynamic object as road user (a vehicle or pedestrian, for example) may move without manual annotation data. For example, automatically recorded data such as the traffic area data, the position data such as odometry data, and vehicle parameters such as the vehicle shape are used for this purpose. A further main aspect may be regarded in particular as how such a network or such a classifier is trained. Thus, according to one exemplary embodiment, using the approach presented here it is possible to achieve an optimal automatic annotation of the temporally traversable free space of dynamic objects, for example using deep neural networks as artificial intelligence.

The advantages of using one exemplary embodiment of the approach presented here may be summarized as follows:
- "Label noise" due to human annotation errors is no longer to be expected.
- Maximum possible annotation data quality may be achieved.
- It is possible to limit the annotation costs to the recording of sequences (arbitrary sensor).
- It is not necessary to generate annotations that have no value, such as free spaces in which, for example, a road user such as a vehicle does not fit.
- It is not necessary to generate annotations that result in a hazardous situation, for example driving too close to a pedestrian who is still in motion. The driver of the vehicle will allow for an appropriate safety distance during the sequence recording.
- There is no need to evaluate an optical flow, since the movement of other dynamic objects is already taken into account in the free space computation.

Without limiting generality, one exemplary embodiment of the approach presented here may be described in greater detail based on the case of vehicles as road users. The illustration of the 3D annotations, which may be based on various known strategies (voxels, for example), is not discussed. The procedure may be carried out using arbitrary dynamic objects.

1. A recording of sequence and vehicle data/odometry data, in the present case the traffic area data and the position data, for example, initially takes place. In addition, for each vehicle that is used for introducing annotation data, as in the illustration from FIG. 1, road user 100 a vehicle model (in the present case, vertical profile 167 or the silhouette, possibly in conjunction with road user class 168), since the free space volume is a function of same.
2. For each image (in the present case, for example based on traffic area data 110 from camera 125), computing the volume that will be subsequently occupied by the vehicle as road user 100, i.e., which section 135 of traffic area 130 the vehicle will use (which corresponds to the volume trajectory of the movement of road user 100). This is possible by use of the odometry data. Alternatively, the sought trajectory may also be ascertained using image processing means, i.e., by evaluating the image data delivered by camera 120 (visual odometry). Thus, for each sequence and the corresponding vehicle, for each image an area/section 135, an area in which the vehicle may safely move may be ascertained. However, what is to be ascertained is the area in which the vehicle as a road user may safely move, which may be approximated using these data. In FIG. 1, this corresponds to traffic area data 105 provided with annotations, together with neighboring traffic area data 145 provided with neighboring annotation data set 175.
3. In one very simple variant, only the instantaneous driving path is depicted as a drivable surface, and areas that another driver might have traveled are excluded. This problem may be solved by back-propagating only the error of the trajectory volume for the training period for each annotation, and back-propagating no error for the remainder of the 3D space. It is then necessary only to ensure that no relevant knowledge is deleted from the weights of the network or classifier 178 or neural network. This may occur due to the fact that the weights are changed only with regard to the trajectory volume. To solve this problem, for example the learning rate of the (neural) network as classifier 178 may be greatly reduced, which would be the simplest approach, or methods for preventing "catastrophic forgetting" may be used.

The trained network now delivers the drivable space for each image or each section 135 of traffic area 130.

Figure 3:
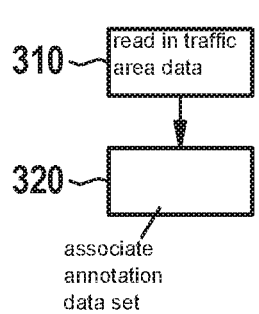
FIG. 3 shows a flowchart of one exemplary embodiment of a method for providing traffic area data that are provided with at least one annotation, in accordance with the present invention.

FIG. 3 shows a flowchart of one exemplary embodiment of a method 300 for providing traffic area data that are provided with at least one annotation. Method 300 includes a step 310 of reading in traffic area data that in each case represent a section of a traffic area used by a road user, and reading in automatically detected position data of the road user in the traffic area. In addition, method 300 includes a step 320 of associating in each case at least one annotation data set with the traffic area data at which the road user is situated at the moment, corresponding to the detected position data, in order to obtain the annotated traffic area data that signal a use option and/or movement option of the traffic area, represented by the traffic area data, by another road user, in particular the annotation data set having been generated using a machine learning method and/or a classifier based on a machine learning algorithm.

Figure 4:
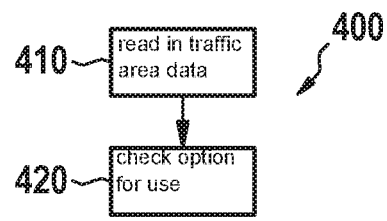
FIG. 4 shows a flowchart of one exemplary embodiment of a method for evaluating a use of sections of the traffic area to be used by a road user, in accordance with the present invention.

FIG. 4 shows a flowchart of one exemplary embodiment of a method 400 for evaluating a use of sections of the traffic area to be used by a road user. Method 400 includes a step 410 of reading in traffic area data that are provided with at least one annotation, and that have been created using a method described herein, and position data that represent an instantaneous or future position of the road user. Furthermore, method 400 includes a step 420 of checking an option for use of at least one section of the traffic area by the road user, using an annotation data set and the position data.

Figure 5:
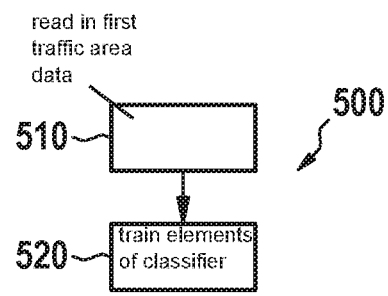
FIG. 5 shows a flowchart of one exemplary embodiment of a method for training a classifier based on a machine learning algorithm, in accordance with the present invention.

FIG. 5 shows a flowchart of one exemplary embodiment of a method 500 for teaching a classifier based on a machine learning algorithm. Method 500 includes a step 510 of reading in first traffic area data which in each case represent a section of a traffic area that is used or is to be used by a first road user, as well as automatically detected first position data of the first road user, and reading in second traffic area data which in each case represent a section of a traffic area that is used or is to be used by a second road user, as well as automatically detected second position data of the second road user. In addition, method 500 includes a step 520 of training elements of the classifier, using the first and second traffic area data and the first and second position data. In the present context, an element of the classifier may be understood to mean, for example, a node, in particular of a neural network.

The advantages described here may be achieved quickly and efficiently using such specific embodiments of the approach presented here.

If an exemplary embodiment includes an "and/or" linkage between a first feature and a second feature, this may be construed in such a way that according to one specific embodiment, the exemplary embodiment has the first feature as well as the second feature, and according to another specific embodiment, the exemplary embodiment either has only the first feature or only the second feature.

What is claimed is:

1. A method of a first one of a plurality of road users, the first one of the plurality of road users being a vehicle, the method comprising the following steps:
  transmitting, by the first one of a plurality of road users, a respective instance of traversal data to a central server that:
    obtains further respective instances of the traversal data from others of the plurality of road users, each of the instances of the traversal data including:
      sensed traffic area data that, in each case, represent a section of a traffic area used by the respective road user;
      automatically detected position data of the respective road user in the traffic area representing a respective positional sequence of the respective road user;
      a respective classification of the respective road user; and
      an identification of a characteristic of a volumetric occupation by the respective road user;
    executes a neural network that, for each of a plurality of predefined road user types that each requires an area to have at least one respective area characteristic to be traversable by the respective predefined road user type, automatically classifies, based on the obtained sensed traffic area data, the respective positional sequences, the obtained respective classifications, and the obtained identifications of the volumetric occupation characteristic, whether respective ones of the sections of the traffic area have the at least one respective area characteristic allowing traversal of the respective ones of the sections by the respective predefined road user type; and
    transmits to each of one or more of the road users (a) that are of respective ones of the plurality of predefined type and (b) that includes the first road user, an indication of whether one or more of the classified sections of the traffic area is traversable by the respective road user to which the transmission is made; and
  performing an autonomous drive control of the vehicle based on the indication obtained by the transmission from the central server.

2. The method as recited in claim 1, wherein, when the neural network is executed, the neural network further classifies a traversability of respective ones of neighboring sections of the traffic area not indicated to have been previously used by the plurality of road users.

3. The method as recited in claim 2, wherein the central server obtains, for respective instances of the traversal data, neighboring traffic area data that represent a traffic area that is not currently in use by the road user or is not to be used by the road user.

4. The method as recited in claim 1, wherein the identification of the characteristic of the volumetric occupation includes a vertical profile above the traffic area used by the road user, which represents a contour of the road user, and/or a silhouette which represents the contour of the road user above the traffic area used by the road user.

5. The method as recited in claim 1, wherein the sensed traffic area data are ascertained using images recorded using a camera, and/or the position data are ascertained using an odometry unit and/or a satellite navigation system.

6. The method as recited in claim 1, wherein the sections of the traffic area used by the road users include at least one of a roadway for at least one vehicle and a pedestrian walkway.

7. A device of a first one of a plurality of road users, the first one of the plurality of road users being a vehicle, the device comprising a processor of the vehicle, wherein the processor is configured to:
  transmit a respective instance of traversal data to a central server to which the vehicle is communicatively coupled and that:
    obtains further respective instances of the traversal data from others of the plurality of road users, each of the instances of the traversal data including:
      sensed traffic area data that, in each case, represent a section of a traffic area used by the respective road user;
      automatically detected position data of the respective road user in the traffic area representing a respective positional sequence of the respective road user;
      a respective classification of the respective road user; and
      an identification of a characteristic of a volumetric occupation by the respective road user;
    executes a neural network that, for each of a plurality of predefined road user types that each requires an area to have at least one respective area characteristic to be traversable by the respective predefined road user type, automatically classifies, based on the obtained sensed traffic area data, the respective positional sequences, the obtained respective classifications, and the obtained identifications of the volumetric occupation characteristic, whether respective ones of the sections of the traffic area have the at least one respective area characteristic allowing traversal of the respective ones of the sections by the respective predefined road user type; and
    transmits to each of one or more of the road users (a) that are of respective ones of the plurality of predefined type and (b) that includes the first road user, an indication of whether one or more of the classified sections of the traffic area is traversable by the respective road user to which the transmission is made; and
  perform an autonomous drive control of the vehicle based on the indication obtained by the transmission from the central server.

8. A non-transitory machine-readable memory medium on which are stored instructions that are executable by a computer of a first one of a plurality of road users and that, when executed by the computer, cause the computer to perform a method, the first one of the plurality of road users being a vehicle and the method comprising the following steps:
  transmitting a respective instance of traversal data to a central server that:
    obtains further respective instances of the traversal data from others of the plurality of road users, each of the instances of the traversal data including:
      sensed traffic area data that, in each case, represent a section of a traffic area used by the respective road user;
      automatically detected position data of the respective road user in the traffic area representing a respective positional sequence of the respective road user;

a respective classification of the respective road user; and an identification of a characteristic of a volumetric occupation by the respective road user;

executes a neural network that, for each of a plurality of predefined road user types that each requires an area to have at least one respective area characteristic to be traversable by the respective predefined road user type, automatically classifies, based on the obtained sensed traffic area data, the respective positional sequences, the obtained respective classifications, and the obtained identifications of the volumetric occupation characteristic, whether respective ones of the sections of the traffic area have the at least one respective area characteristic allowing traversal of the respective ones of the sections by the respective predefined road user type; and transmits to each of one or more of the road users (a) that are of respective ones of the plurality of predefined type and (b) that includes the first road user, an indication of whether one or more of the classified sections of the traffic area is traversable by the respective road user to which the transmission is made; and performing an autonomous drive control of the vehicle based on the indication obtained by the transmission from the central server.

\* \* \* \* \*